United States Patent [19]

Taniguchi et al.

[11] Patent Number: 5,156,227

[45] Date of Patent: Oct. 20, 1992

[54] CLUTCH CONTROL METHOD AND CLUTCH CONTROLLER FOR MOTOR-DRIVEN POWER STEERING APPARATUS

[75] Inventors: Yoshiaki Taniguchi; Masaki Watanabe, both of Higashimatsuyama; Ryuji Iizawa, Kawasaki, all of Japan

[73] Assignees: Jidosha Kiki Co., Ltd.; Fujitsu Limited, both of Japan

[21] Appl. No.: 572,842

[22] Filed: Aug. 24, 1990

[30] Foreign Application Priority Data

Aug. 25, 1989 [JP] Japan .................. 1-217283
Aug. 25, 1989 [JP] Japan .................. 1-217286

[51] Int. Cl.$^5$ ..................... B62D 5/04; B62D 5/06
[52] U.S. Cl. ..................... 180/79.1; 180/141; 180/142; 364/424.05
[58] Field of Search ............. 180/79.1, 142, 141; 364/424.05; 318/434, 294, 375

[56] References Cited

U.S. PATENT DOCUMENTS

| | | | |
|---|---|---|---|
| Re. 33,140 | 1/1990 | Booth | 361/154 |
| 4,581,565 | 4/1986 | Van Pelt et al. | 318/294 |
| 4,736,810 | 4/1988 | Morishita et al. | 180/79.1 |
| 4,802,543 | 2/1989 | Ishikura et al. | 180/79.1 |
| 4,842,087 | 6/1989 | Morishita et al. | 180/79.1 |
| 4,913,249 | 4/1990 | Lang | 180/141 |
| 5,020,617 | 6/1991 | Oshita et al. | 180/79.1 |
| 5,065,325 | 11/1991 | Takahashi | 364/424.05 |

FOREIGN PATENT DOCUMENTS

| | | |
|---|---|---|
| 2313706 | 9/1974 | Fed. Rep. of Germany ..... 180/79.1 |
| 3723205 | 1/1988 | Fed. Rep. of Germany . |
| 3909472 | 8/1990 | Fed. Rep. of Germany . |

Primary Examiner—Charles A. Marmor
Assistant Examiner—Paul Dickson
Attorney, Agent, or Firm—Blakely Sokoloff Taylor & Zafman

[57] ABSTRACT

In a clutch control method of a motor-driven power steering apparatus, a clutch is disconnected when a change width of a steering angle detected by a steering angle sensor is a predetermined angle or less and a steering torque detected by a torque sensor is a predetermined torque or more in both the steering directions. A clutch controller of a motor-driven power steering apparatus includes a first transistor arranged between one terminal of the clutch coil and a power source, a second transistor arranged between the other terminal of the clutch coil and an earth, and a current sensor connected in series with the first and second transistor.

2 Claims, 6 Drawing Sheets

CLUTCH CONTROL METHOD AND CLUTCH CONTROLLER FOR MOTOR-DRIVEN POWER STEERING APPARATUS

BACKGROUND OF THE INVENTION

The present invention relates to a clutch control method and a clutch controller for a motor-driven power steering apparatus and, more particularly, to a clutch control method to be performed when mechanical rotation of a motor is disabled after a power steering apparatus is activated and a clutch controller which can detect abnormality of a clutch driver.

A power steering apparatus for assisting a steering force of a steering wheel by a motor is conventionally known.

FIG. 5 is a view showing an arrangement of a conventional motor-driven power steering apparatus, and FIG. 6 is a block diagram of the same.

Referring to FIG. 5, reference numeral 1 denotes a signal controller; 2, an ignition switch; 3, an engine; 4, a generator driven by the engine 3; 4a, an L terminal of the generator 4; 5, a battery; 6, a torque sensor for detecting a steering torque obtained by a steering wheel 33 and its steering direction; 7, a steering angle sensor for detecting a steering angle and an angular speed of a steering mechanism 34 for pivoting wheels; 8, a motor for assisting a steering force; and 9, an electromagnetic clutch. The electromagnetic clutch 9 flows or shuts off a current with respect to a clutch coil to perform a clutch operation, thereby connecting or disconnecting a torque of the motor 8 to or from the steering mechanism 34. Reference numeral 30 denotes a power controller.

Referring to FIG. 6, reference numeral 10 denotes a warning lamp (power steering warning lamp); 11, a signal processor; 12, a vehicle speed pulse input unit; 13, an L terminal voltage detector for detecting a voltage of the L terminal 4a of the generator 4; 14, a torque voltage input unit; 15, a steering angle/angular speed input unit; 16, an A/D converter; 17, a clutch driver for driving the electromagnetic clutch 9; 18, a lamp driver for driving the power steering warning lamp 10; 19, a power source; 20, a reckless driving detector; 21, a PWM output unit; 22, a direction switch; 31, a motor driver; 32, a current sensor.

Referring FIGS. 5 and 6, the motor 8 and the electromagnetic clutch 9 are related to the present invention. The motor 8 is driven by the motor driver 31 under the control of a PWM value signal and a direction signal supplied from the PWM output unit 21 and the direction switch 22, respectively, which receive designation from the signal processor 11. The electromagnetic clutch 9 is driven by the clutch driver 17 which receives designation from the signal processor 11.

FIG. 7 is a circuit diagram showing the conventional clutch driver 17. Referring to FIG. 7, reference symbols T1 and T2 denote the output and input terminals, respectively, of the signal processor 11; Q1 to Q4, transistors; CP, a comparator; 9a, a clutch coil; and E, an earth.

In this arrangement, when a signal of level "L" is output from the terminal T1, the transistors Q1, Q2, and Q3 are turned on to flow a current through the clutch coil 9a. When a signal of level "H" is output from the terminal T1, the transistors Q1, Q2, and Q3 are turned off to shut off the current from the clutch coil 9a. An emitter potential of the transistor Q3 is normally at 0.24 V. In this case, a signal output from the comparator CP to the terminal T2 is at level "L" to indicate a normal operation.

If, however, an overcurrent is flowed to the transistor Q3 for a certain reason, $V_{CE}$ of the transistor Q3 is increased, and an input voltage to the inverting terminal of the comparator CP is decreased to be smaller than 0.24 V. Therefore, the comparator CP outputs a signal of level "H" to inform the signal processor 11 of the abnormality of the clutch driver 17 side. In addition, if the clutch coil 9a is disconnected or a ground line (a line at the collector side of the transistor Q3) and the earth are shortcircuited, the input voltage to the inverting terminal of the comparator CP is similarly decreased. Therefore, the comparator CP outputs a signal of level "H" to inform the signal processor 11 of the abnormality.

If, however, mechanical rotation of the motor for assisting the steering force is disabled due to, e.g., removal of a field magnet, steering of an automobile is disabled to expose a driver to a serious danger.

In addition, in the clutch driver described above, even if an overcurrent caused by rare short of the clutch coil 9a is detected, a countermeasure of, e.g., disconnecting the electromagnet clutch 9 cannot be performed. Therefore, since the electromagnetic clutch 9 cannot be disconnected in case of emergency, a driver is exposed to a serious danger.

SUMMARY OF THE INVENTION

The present invention has been made in consideration of the above situation, and has as its first object to provide a clutch control method of the motor-driven power steering apparatus, which detects a disable state of mechanical rotation of a motor after the power steering apparatus is activated, thereby performing fail processing.

It is a second object of the present invention to provide a clutch controller which can detect abnormality of a clutch coil and circuits of an electromagnetic clutch driver and can disconnect the electromagnetic clutch when abnormality is detected.

According to the first aspect of the present invention, there is provided a clutch control method of a motor-driven power steering apparatus including a motor for assisting a steering force, a steering mechanism driven by the motor to perform a steering operation, clutch means for connecting/disconnecting the force transmitted from the motor to the steering mechanism, steering angle sensor means for detecting a steering angle of the steering mechanism, and torque sensor means for detecting a steering torque and a steering direction for operating the steering mechanism by using a steering wheel, wherein the clutch means is disconnected when a change width of the steering angle detected by the steering angle sensor means is not more than a predetermined angle and the steering torque detected by the torque sensor means is not less than a predetermined torque in both the steering directions.

According to the second aspect of the present invention, there is provided a clutch controller of a motor-driven power steering apparatus, comprising a first transistor arranged between one terminal of the clutch coil and a power source, a second transistor arranged between the other terminal of the clutch coil and an earth, and a current sensor connected in series with the first or second transistor.

According to the first aspect of the present invention, after the power steering apparatus is activated, a motor failure is determined when a change width of a steering angle is a predetermined angle or more and a steering torque is a predetermined torque or more in both the directions, thereby disconnecting the clutch.

According to the second aspect of the present invention, abnormality of a clutch coil and a clutch driver can be detected by a combination of ON and OFF states of the first and second transistors.

DETAILED DESCRIPTION OF THE PREFERRED EMBODIMENTS

Figure 1:
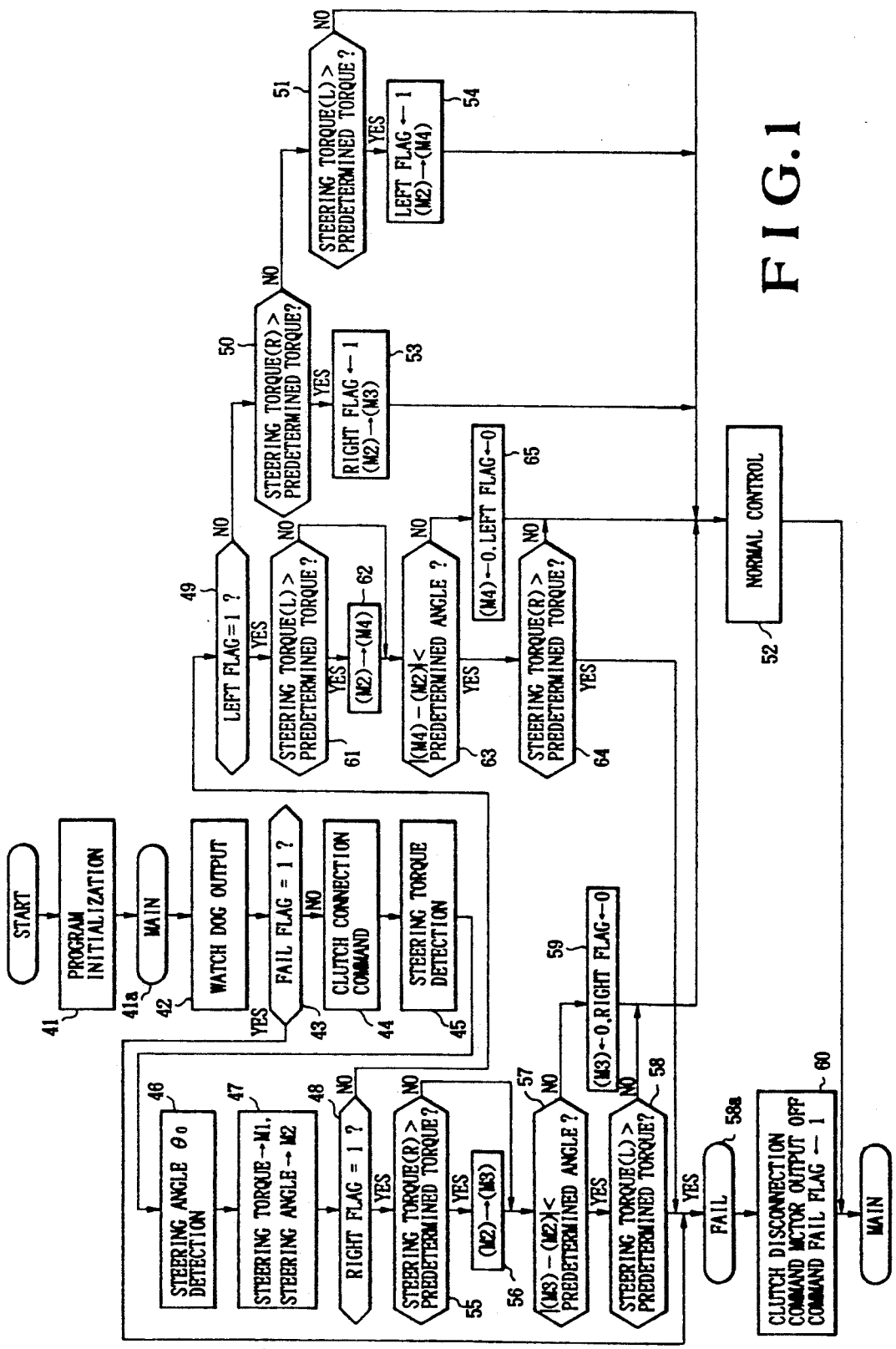
FIG. 1 is a flow chart for explaining a clutch control method of a motor-driven power steering apparatus according to the first embodiment of the present invention.

The first embodiment of the present invention will be described below with reference to FIG. 1. Referring to FIG. 1, programs are initialized by a signal processor 11 (step 41). The next step 41a means a label. A watch dog pulse is output to prevent the system from being stopped (step 42), and whether a fail flag is "1" is checked (step 43). If the fail flag is not "1", the system is not in fail, and the flow advances to step 44. If the fail flag is "1", the system is in fail, and the flow advances to step 58a. Thereafter, steps 41a, 42, 43, 58a, and 60 are repeatedly performed.

A clutch connection command is output (step 44), and a steering torque and a steering angle are detected (steps 45 and 46). The value of the steering torque and the direction of the torque are stored in a memory M1, and a current steering angle value $\theta_0$ is stored in a memory M2 (step 47).

Subsequently, whether a right flag is "1" is checked (step 48). If the right flag is not "1", whether a left flag is "1" is checked in step 49. If the left flag is not "1", the flow advances to step 50 to check in accordance with the memory M1 whether a right steering torque is a predetermined torque or more. If the right steering torque is not the predetermined torque or more, whether a left steering torque is the predetermined torque or more is checked in step 51 in accordance with the memory M1. If the left steering torque is not the predetermined torque or more, normal control is performed to return to step 41a (step 52). If the right steering torque is the predetermined torque or more, the right flag is set to be "1", the content of the memory M2, i.e., the current steering angle value $\theta_0$ is stored in a memory M3, and the flow advances to the normal control (steps 53 and 52). If the right steering torque is the predetermined torque or less and the left steering torque is the predetermined torque or more, the left flag is set to be "1", the content of the memory M2, i.e., the current steering angle $\theta_0$ is stored in the memory M4, and the flow advances to the normal control (steps 54 and 52).

If the right flag is "1", the flow advances to step 55 to check in accordance with the memory M1 whether the right steering torque is the predetermined torque or more. If the right steering torque is the predetermined torque or more, the content of the memory M2, i.e., the current steering angle value $\theta_0$ is stored in the memory M3. If the right steering torque is the predetermined torque or less, the flow immediately advances to step 57. In step 57, whether an absolute value of a difference between the content (M3) of the memory M3 and the content (M2) of the memory M2, i.e., $|(M3)-(M2)|$ is a predetermined value (predetermined angle) or less is checked. If $|(M3)-(M2)|$ is the predetermined value or more, the content of the memory M2 and the right flag are set to be "0", and the flow advances to the normal control (steps 59 and 52). If $|(M3)-(M2)|$ is the predetermined value (predetermined angle) or less, whether the left steering torque is the predetermined torque or more is checked. If the left steering torque is the predetermined torque or more, "fail" is determined as shown in a label (step 58a), disconnection of the clutch and switching off of the motor output are commanded, and the fail flag is set to "1" (step 60). Thereafter, the flow returns to "main" indicated by the label (step 41a). If the left steering torque is the predetermined torque or less in step 58, the normal control is performed (step 52), and the flow returns to "main" in step 41a indicated by the label.

If the right flag is "0" and the left flag is "1", the flow advances to step 61. However, an operation from steps 61 to 65 is the same as that from steps 55 to 59 and a detailed description thereof will be omitted.

The operation will be described in detail below with reference to the flow chart shown in FIG. 1. An operation to be performed in a normal state will be described first. In this case, an operation is normally performed except when steering angle change<predetermined angle is satisfied and a steering torque is generated in the right and left directions. Therefore, normal control in step 52 is performed from step 47 via steps 48, 49, and 50 or 51, and the flow returns to "main" in step 41a. Thereafter, this operation is repeatedly performed.

An operation to be performed in an abnormal state will be described below by taking two cases as examples. In the first case, assuming that a steering wheel is rotated to the right and then to the left when motor lock occurs due to removal of the field magnet of the motor 8. In the second case, to the contrary to the first case, assuming that the steering wheel is rotated to the left and then to the right when motor lock occurs.

The first case will be described first. When the steering wheel is rotated to the right, the right steering torque exceeds a predetermined torque, but almost no change is caused in steering angle since the motor does not rotate. Therefore, since both the right and left flags are "0" in an initial state, the flow advances to step 50 via steps 48 and 49. In step 50, since right steering torque>predetermined torque, the right flag is set to "1", and the first current steering angle $\theta_0$ is stored in the memory M3 (step 53). Subsequently, normal control is performed, and the flow returns to step 41a (step 52). For the second time, the flow similarly advances to step 48 but then advances to step 55 since right flag=1. In step 55, since right steering torque>predetermined torque, the second current steering angle $\theta_0$ is stored in the memory M3. Therefore, the content (M3) of the memory M3 is equal to the second current steering angle $\theta_0$, $|(M3)-(M2)|$ is a predetermined angle or less, and the flow advances from step 57 to 58. In step 58, the magnitude of the left steering torque is checked. Since left steering torque>predetermined is not satisfied, the flow returns to "main" via the normal control (steps 52 and 41a). Assume that left steering torque > predetermined torque is satisfied in the third operation of the flow chart. That is, assume that a driver rotates a steering wheel to the right and then to the left at a timing of the third flow chart operation. In this case, although the flow similarly advances to step 58, a fail state is set because left steering torque>predetermined torque is satisfied (step 58a). Therefore, the flow advances to fail processing in step 60. In the fail processing, a steering wheel operation can be manually performed since the clutch is disconnected. In addition, as is apparent from step 43, an operation of steps 42, 43, and 60 is repeatedly performed in the fail state. Therefore, the controller 1 performs the fail processing as in a manual state.

The second case in which a steering wheel is rotated to the left and then to the right when motor lock occurs will be described below. When the steering wheel is rotated to the left, the left steering torque exceeds a predetermined torque. However, the right steering torque is the predetermined torque or less, and almost no change is caused in steering angle. Therefore, since the right and left flags are initially "0", the flow advances to step 51 via steps 48, 49, and 50. In step 51, since left steering torque>predetermined, the left flag is set to be "1", and the first current steering angle $\theta_0$ is stored in the memory M4 (step 54). Then, the normal control is performed, and the flow returns to step 41a (step 52). For the second time, the flow similarly advances to step 49 but then advances to step 61 since left flag=1 is satisfied. In step 61, since left steering torque>predetermined torque is satisfied, the second current steering angle $\theta_0$ is stored in the memory M4. Therefore, the content (M4) in the memory M4 is equal to the current steering angle $\theta_0$, $|(M4)-(M2)|$ is a predetermined angle or less, and the flow advances from step 63 to 64. In step 64, the magnitude of the right steering torque is checked. Since right steering torque>predetermined torque is no satisfied, the flow returns to "main" via the normal control (steps 52 and 41a). Assume that right steering torque>predetermined torque is satisfied in the third operation of the flow chart. That is, assume that a driver rotates the steering wheel to the left and then to the right at a timing of the third flow chart operation. In this case, although the flow similarly advances to step 64, a fail state is set since right steering torque>predetermined torque is satisfied (step 58a). Therefore, the flow advances to the fail processing in step 60. In the fail processing, a steering wheel operation can be performed because the clutch is disconnected. In addition, as is apparent from step 43, the operation of steps 42, 43, and 60 is repeatedly performed in the fail state. Therefore, the controller 1 performs the fail processing as in a manual state.

Figure 2:
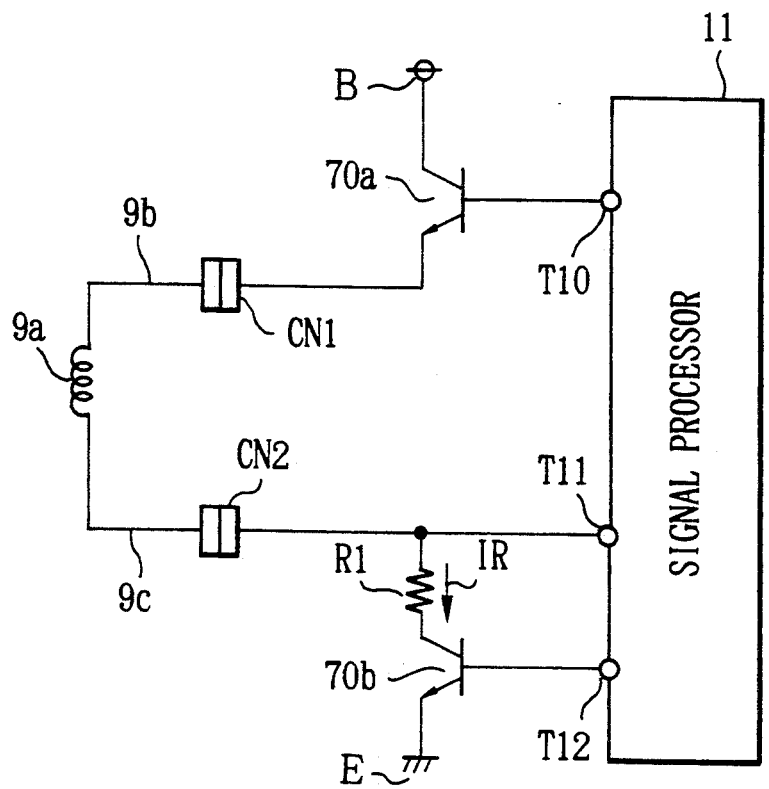
FIG. 2 is a circuit diagram showing a clutch controller of a motor-driven power steering apparatus according to the second embodiment of the present invention.

FIG. 2 is a circuit diagram showing the second embodiment of the present invention.

Referring to FIG. 2, reference symbols T10 to T12 denote terminals of a signal processor 11. Reference number 70a denotes a first transistor; 70b, a second transistor; and 9a, a clutch coil. Reference symbols CN1 and CN2 denote connectors; R1, a resistor as a current sensor; E, an earth; and B, a power source line.

Figure 3:
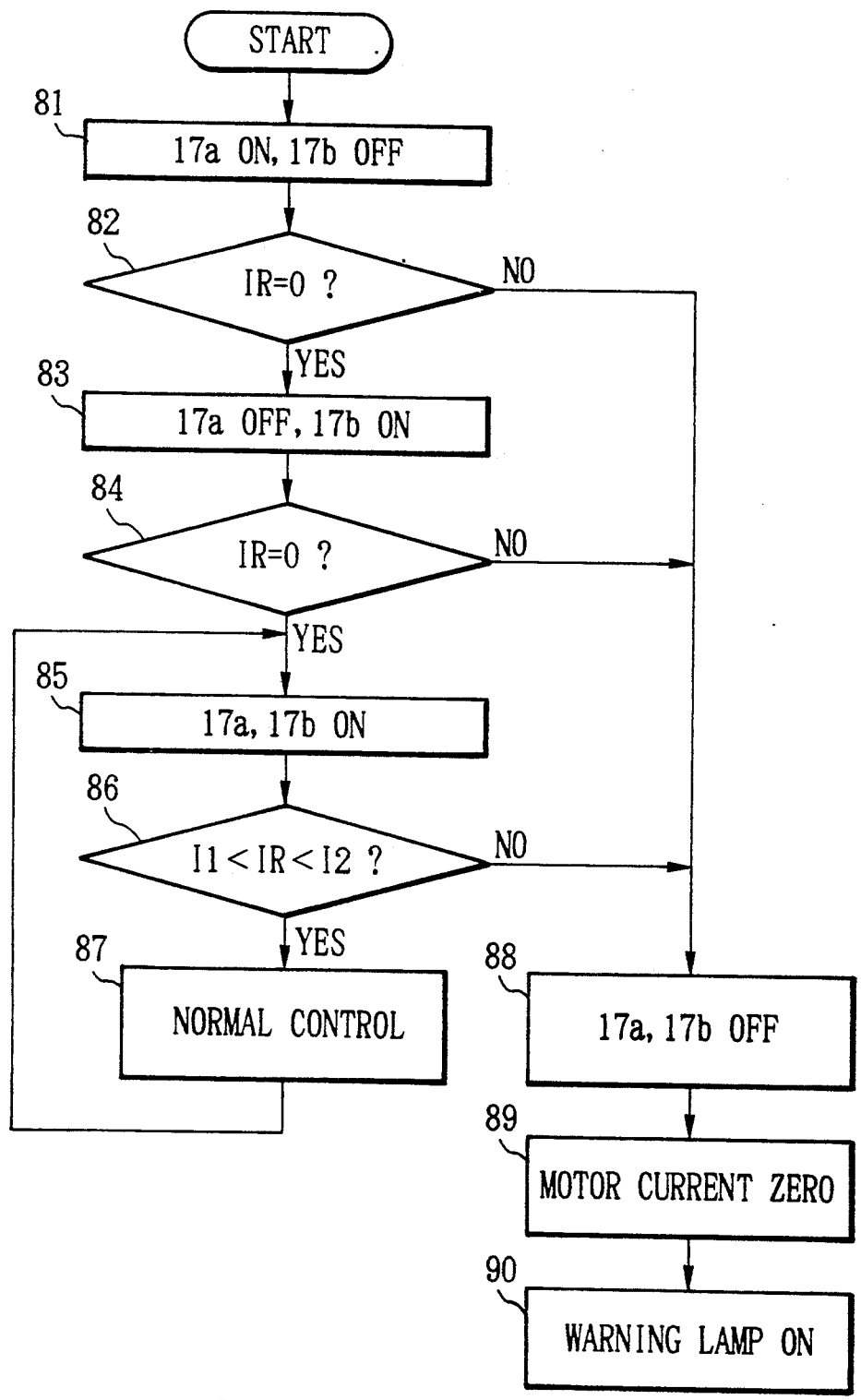
FIG. 3 is a flow chart for explaining an operation of the circuit shown in FIG. 1.

An operation of the circuit shown in FIG. 2 will be described below with reference to a flow chart shown in FIG. 3. Referring to FIG. 3, steps 81 to 84 represent an operation to be performed upon initial diagnosis; 85 to 87, an operation to be performed in a normal state; and 88 to 90, an operation to be performed in an abnormal state. Firstly, the transistor 70a is turned on and the transistor 70b is turned off to check whether a current IR flowing through the resistor R1 is 0 (steps 81 and 82). If IR=0, the flow advances to step 83, and the transistor 70a is turned off and the transistor 70b is turned on to check whether the current IR flowing through the resistor is 0 (step 84). If IR=0, the flow advances to step 85, both the transistors 70a and 70b are turned on to check whether I1<IR<I2 is satisfied (step 86). If I1<IR<I2 is satisfied, a normal state is determined, and the normal control is performed (step 87). When the normal control is finished, the flow returns to step 85. thereafter, steps 85 to 87 are repeated.

If all of steps 82, 84, and 86 are satisfied in FIG. 3, none of the following failures occurs. That is, the failures are a short circuit between one terminal side of the clutch coil 9a, i.e., a line (to be referred to as a "clutch power source line" hereinafter) 9b at the connector CN1 side and the earth E, a short circuit between, a short circuit between the other terminal side of the clutch coil 9a, i.e., a line (to be referred to as a "clutch earth line " hereinafter) 9c at the connected CN2 side and the earth E, a short circuit between the clutch coil 9a and the earth E, a rare short between coils of the clutch coil 9a, a disconnection of the clutch power source line 9b or the clutch earth line 9c, and a disconnection of the clutch coil 9a. When a short circuit occurs between the clutch power source line 9b and the earth E, the current IR detected by the resistor R1 is constantly zero, i.e., step 86 is not satisfied. This similarly happens when a short circuit occurs between the clutch earth line 9c and the earth E or between the clutch coil 9a and the earth E. When a rare short occurs between the coils of the clutch coil 9a, I1<IR<I2 in step 86 is not satisfied. When a disconnection of the line 9b or 9c or the clutch coil 9a occurs, Ir=0 is satisfied. Therefore, I1<IR<I2 in step 86 is not satisfied.

If IR=0 is not satisfied in step 82 or 84, abnormality is determined. This situation occurs when the line 9b to 9c is short circuited to the power source line B. For example, when the line 9a is short circuited to the power source line B, a current flows through the resistor R1 even if the transistor 70 is turned off. When the line 9b and the power source line B are short circuited, a similar symptom occurs although a current value is different. These abnormalities cannot be detected in step 86 since the resistance of the clutch coil 9a is much smaller than the value of the resistor R1. Therefore, the check operation in steps 81 to 84 is performed upon initial diagnosis to confirm that no abnormality as described above occurs, and then the flow advances to the normal check operation.

Figure 5:
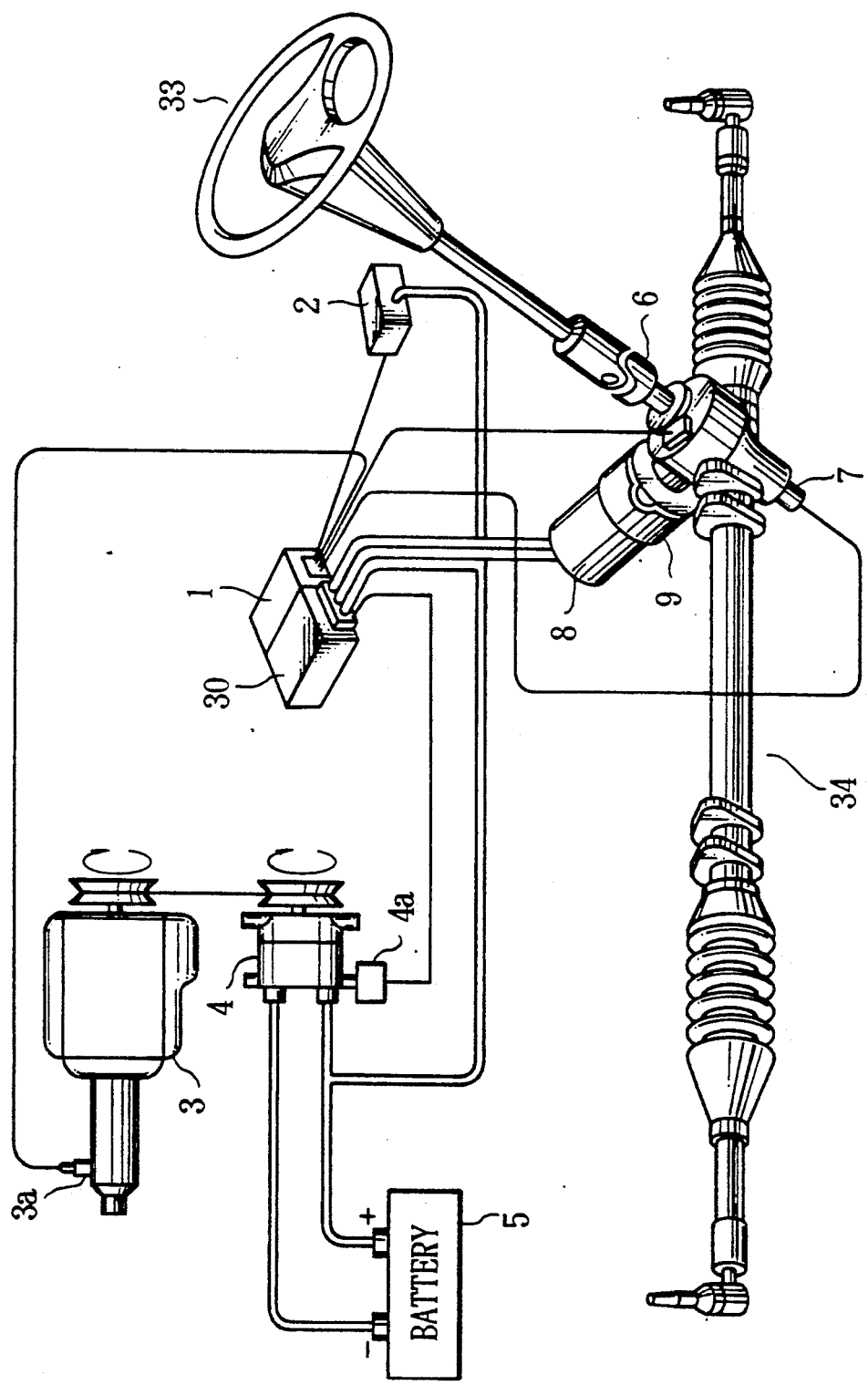
FIG. 5 is a view showing an arrangement of a conventional motor-driven power steering apparatus.
Figure 6:
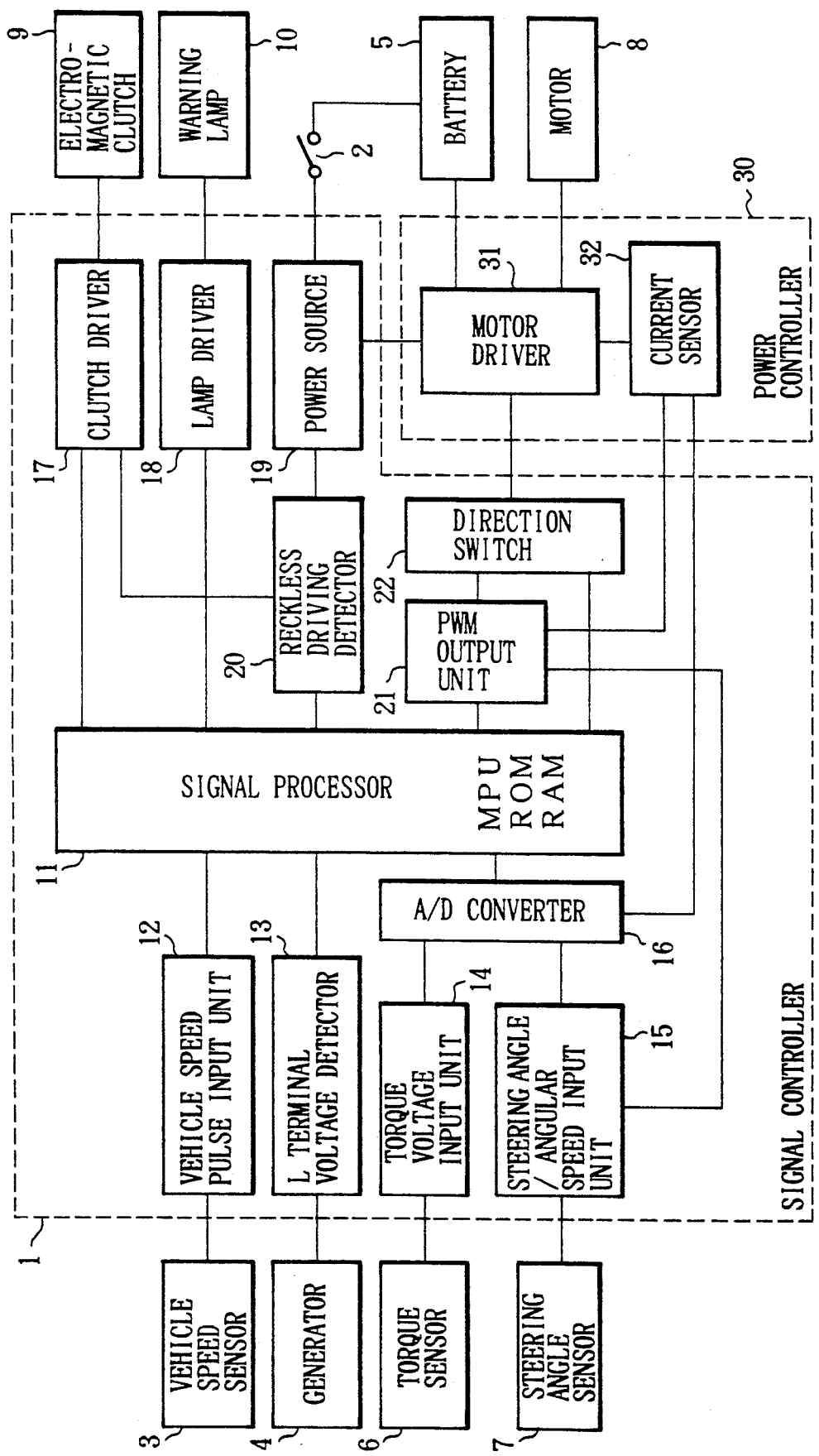
FIG. 6 is a block diagram showing the apparatus shown in FIG. 5.
Figure 7:
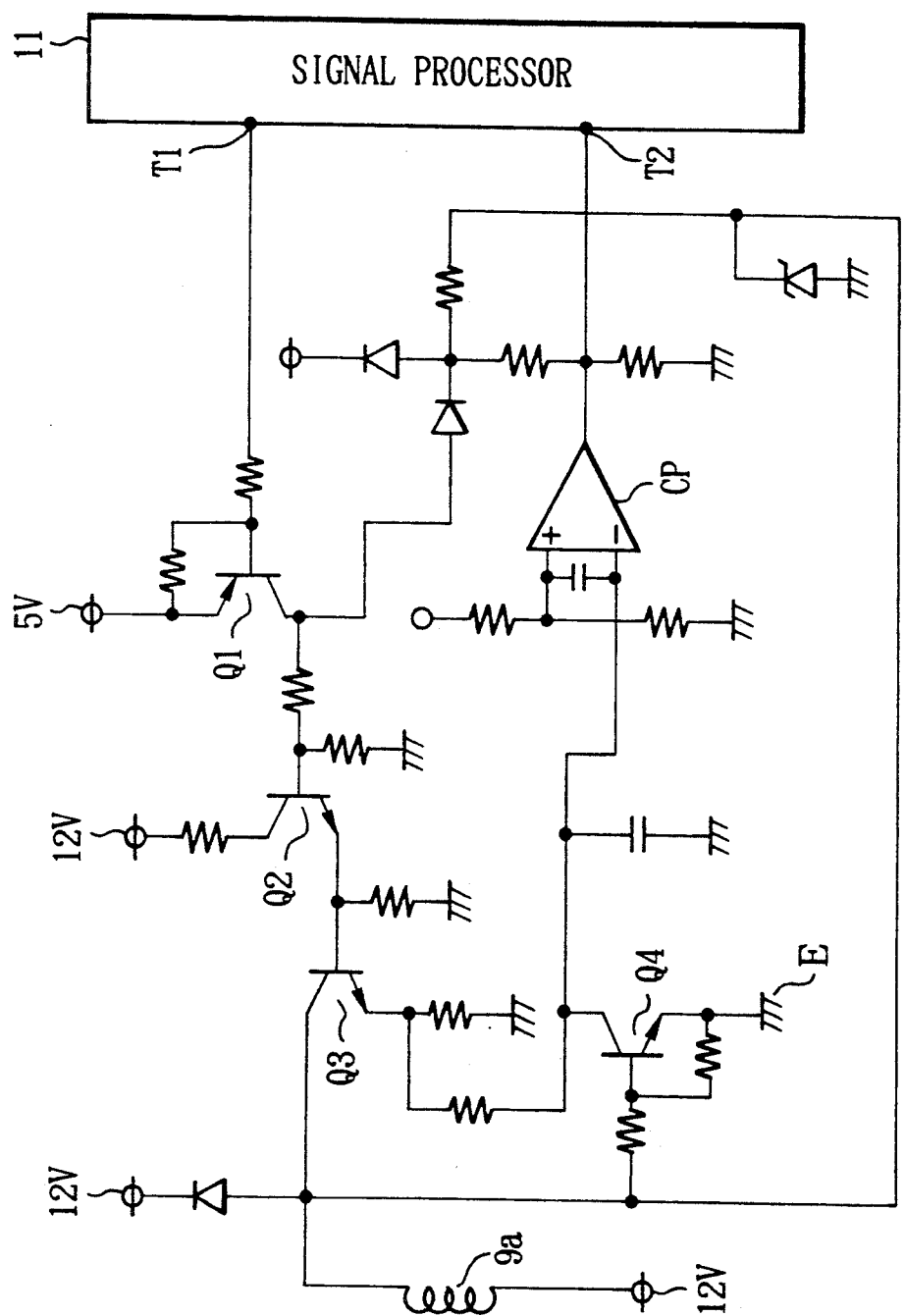
FIG. 7 is a circuit diagram showing a conventional electromagnetic clutch driver.

When abnormality is determined in the check operation upon initial diagnosis or in the normal check operation, the transistors 70a and 70b are turned off to stop power supply to the clutch coil 9a and the assisting motor 8, thereby turning on the warning lamp 10 (FIG. 5) (steps 88 to 90).

Figure 4:
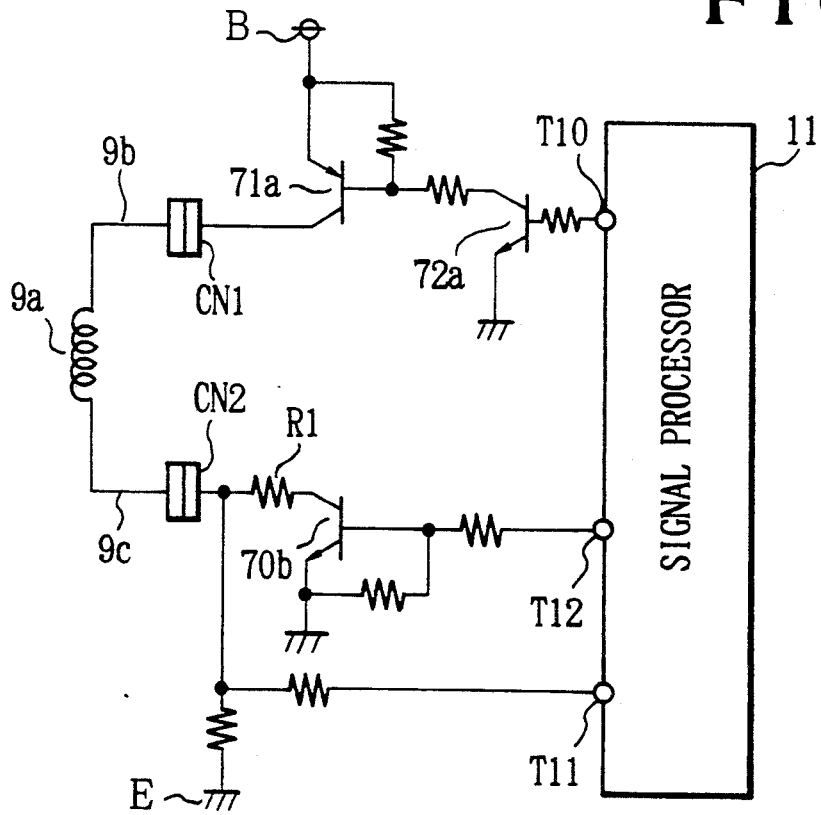
FIG. 4 is a circuit diagram showing a practical arrangement of the circuit shown in FIG. 2.

FIG. 4 shows a practical arrangement of the circuit shown in FIG. 2. The transistor 70a shown in FIG. 2 is constituted by transistors 71a and 72a in FIG. 4.

In the above embodiment, the resistor R1 as a current sensor is connected to the collector side of the second transistor. However, the same effect can be obtained when the resistor R1 is connected to the emitter side of the first transistor. In addition, in the above embodiment, a detection time of the value of the current IR may have a certain width so that circuit is not operated by an instantaneous overcurrent. Furthermore, a motor-driven power steering apparatus for front wheels is exemplified in the above embodiment, the present invention can be similarly applied to a motor-driven power steering apparatus for rear wheels.

As has been described above, in the motor-driven power steering apparatus according to the present invention, a clutch for transmitting a force of a motor to a steering mechanism is disconnected when a change width of a steering angle is a predetermined angle or less and a steering torque is a predetermined torque or more in the right and left directions. As a result, a dangerous driving state caused when mechanical rotation of the motor is disabled after the power steering apparatus is activated can be effectively prevented.

In addition, first and second transistors are provided at the power source and earth sides of the clutch coil, and a current sensor is arranged in series with the first or second transistor. Therefore, abnormality of the clutch coil and a clutch driver can be detected in accordance with an On/OFF operation of the first or second transistor, and power supply to the clutch coil can be stopped by turning off the first and second transistors when abnormality is detected.

What is claimed is:

1. A clutch control method for a motor-driven power steering apparatus, which steering apparatus includes a motor for assisting a steering force, a steering mechanism driven by said motor to perform a steering operation for each of two steering directions, a clutch for connecting/disconnecting the force transmitted from said motor to said steering mechanism, a steering angle sensor for detecting a steering angle of said steering mechanism, and a torque sensor for detecting a magnitude of a steering torque and said steering direction, for operating said steering mechanism by using a steering wheel, said method comprising the steps of:

detecting the width of a steering angle using said steering angle sensor;

detecting the steering torque using said torque sensor; and disconnecting said clutch means when a change of width of the steering angle is not more than a predetermined angle and the steering torque is not less than a predetermined torque in both steering directions.

2. A clutch controller of a motor-driven power steering apparatus, which steering apparatus includes a motor for assisting a steering force, a steering mechanism driven by said motor to perform a steering operation, clutch means for connecting/disconnecting the force transmitted from said motor to said steering mechanism in accordance with the presence/absence of power supplied to a clutch coil, steering angle sensor means for detecting a steering angle of said steering mechanism, and torque sensor means for detecting a magnitude of a steering torque and a steering direction, for operating said steering mechanism by using a steering wheel, said clutch controller comprising:

a first transistor arranged between one terminal of said clutch coil and a power source;

a second transistor arranged between the other terminal of said clutch coil and ground; and a current sensor arranged between said first transistor and said second transistor, whereby abnormal operation of the clutch may be detected from the output of the current sensor when said first and second transistors are alternatively switched off, and the coil can be electrically disconnected from the power source by switching the transistors off upon detection of the abnormal operation.

* * * * *

UNITED STATES PATENT AND TRADEMARK OFFICE
CERTIFICATE OF CORRECTION

PATENT NO. : 5,156,227
DATED : October 20, 1992
INVENTOR(S) : Taniguchi et al.

It is certified that error appears in the above-identified patent and that said Letters Patent is hereby corrected as shown below:

On the title page, item:

[57] Abstract, last line, replace "first and second transisitor." with --first or second transistor.--

Signed and Sealed this

Twelfth Day of September, 1995

Attest:

BRUCE LEHMAN

Attesting Officer

Commissioner of Patents and Trademarks